(12) United States Patent
Kim et al.

(10) Patent No.: US 12,517,574 B1
(45) Date of Patent: Jan. 6, 2026

(54) METHOD AND APPARATUS FOR MATCHING USER MOTION TRACKED BY HETEROGENEOUS SENSORS

(71) Applicant: ELECTRONICS AND TELECOMMUNICATIONS RESEARCH INSTITUTE, Daejeon (KR)

(72) Inventors: Jong Sung Kim, Daejeon (KR); Youn Hee Gil, Daejeon (KR); Dae Wook Kim, Daejeon (KR); Seong Il Yang, Daejeon (KR); Min Sung Yoon, Daejeon (KR); Si Hwan Jang, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 0 days.

(21) Appl. No.: 19/093,694

(22) Filed: Mar. 28, 2025

(30) Foreign Application Priority Data

Jul. 3, 2024 (KR) ........................ 10-2024-0087655

(51) Int. Cl.
*G06F 3/01* (2006.01)
*G06F 3/0346* (2013.01)
(Continued)

(52) U.S. Cl.
CPC ............ *G06F 3/012* (2013.01); *G06F 3/0346* (2013.01); *G06T 7/246* (2017.01); *G06T 7/80* (2017.01);
(Continued)

(58) Field of Classification Search
CPC ........ G06F 3/012; G06F 3/0346; G06F 3/033; G06F 3/03; G06T 7/246; G06T 7/80;
(Continued)

(56) References Cited

U.S. PATENT DOCUMENTS 8,600,192 B2 * 12/2013 Liu ........................... G06T 7/73
382/285
9,906,775 B2 2/2018 Seo et al.
(Continued)

FOREIGN PATENT DOCUMENTS

KR 10-2186220 B1 12/2020
KR 10-2433074 B1 8/2022

OTHER PUBLICATIONS

Jong-Sung Kim, "A New Full-body Motion Tracking System using an Outside-in HMD Tracker and a RGB-D Camera", Journal of The Institute of Electronics and Information Engineers vol. 61, No. 6, Jun. 2024.

*Primary Examiner* — Pegeman Karimi
(74) *Attorney, Agent, or Firm* — LRK PATENT LAW FIRM (57) ABSTRACT

A method and an apparatus for registering motion of a user tracked by heterogeneous sensors are disclosed. The method includes initializing the first sensor so that an origin of a first sensor coordinate system is adjacent to an origin of a device coordinate system, wherein the device coordinate system is a three-dimensional coordinate system with a current position of the device as the origin; and determining a calibration parameter for transforming coordinates of the plurality of feature points according to the first sensor coordinate system to coordinates according to a second sensor coordinate system, based on the position and orientation of the device in the second sensor coordinate system.

15 Claims, 10 Drawing Sheets

(51) Int. Cl.
    *G06T 7/246* (2017.01)
    *G06T 7/80* (2017.01)
    *G06T 13/40* (2011.01)

(52) U.S. Cl.
    CPC .... *G06T 13/40* (2013.01); *G06T 2207/10024* (2013.01); *G06T 2207/10028* (2013.01); *G06T 2207/30196* (2013.01)

(58) Field of Classification Search
    CPC ........... G06T 13/40; G06T 2207/10024; G06T 2207/10028; G06T 2207/30196
    See application file for complete search history.

(56) References Cited

U.S. PATENT DOCUMENTS

| | | | |
|---|---|---|---|
| 2013/0208081 A1* | 8/2013 | Xiong | G06T 7/85 348/E5.051 |
| 2013/0259131 A1* | 10/2013 | Kondo | H04N 19/52 375/240.16 |
| 2015/0022669 A1 | 1/2015 | Hall | |
| 2022/0189113 A1* | 6/2022 | Seo | G06T 7/55 |
| 2024/0029307 A1 | 1/2024 | Kim et al. | |

* cited by examiner

| Motion | Calibration step | Calibration error [m] | |
|---|---|---|---|
| | | Average | Standard deviation |
| Left hand | First step | 0.18058 | 0.10798 |
| | Second step | 0.10739 | 0.02985 |
| | IR [%] | 40.53 | 72.36 |
| Right hand | First step | 0.18454 | 0.09819 |
| | Second step | 0.14712 | 0.04828 |
| | IR [%] | 20.28 | 50.83 |
| Head | First step | 0.20315 | 0.03934 |
| | Second step | 0.16380 | 0.01286 |
| | IR [%] | 19.37 | 67.31 |
| Average | First step | 0.18942 | 0.08184 |
| | Second step | 0.13944 | 0.03033 |
| | IR [%] | 26.39 | 62.94 |

METHOD AND APPARATUS FOR MATCHING USER MOTION TRACKED BY HETEROGENEOUS SENSORS

CROSS-REFERENCE TO RELATED APPLICATION

This application claims priority to Korean Patent Application No. 10-2024-0087655, filed on Jul. 3, 2024 in the Korea Intellectual Property Office, the entire contents of which are incorporated herein by reference.

BACKGROUND

1. Technical Field

The present disclosure relates to a method and apparatus for registering user motion tracked by heterogeneous sensors. More specifically, the present disclosure relates to a method and apparatus for registering a head motion and/or hand motion of an XR user tracked by an outside-in HMD tracker with an upper body motion and/or lower body motion of the XR user tracked by an RGB-D camera.

2. Description of Related Art

The statements in this section merely provide background information related to the present disclosure and do not necessarily constitute prior art.

Extended reality (XR) is a concept including virtual reality (VR), augmented reality (AR), mixed reality (MR), and the like, and is a metaverse technology for combining a real world with a virtual world. In order to enhance the realism, sense of presence, and immersion of XR-based metaverse content, various HMD devices have been developed and are being utilized to experience XR metaverse content.

A way to experience metaverse content is a way to use a three-dimensional avatar representing an XR user. In order to interact with the metaverse content using the three-dimensional avatar, it is important to precisely track head, hand, upper body, and lower body motions of the XR user and transfer the motions of the XR user to the three-dimensional avatar. To this end, an XR controller for tracking a hand operation of a user has been recently used in addition to an HMD device mainly responsible for a visualization function. The XR controller is used for control of operations of the three-dimensional avatars and interactions in the three-dimensional metaverse space.

Tracking a head motion and hand motion of the user is an essential function in an interaction with XR content, and various outside-in head mounted display (HMD) trackers have been developed to support this. The outside-in HMD tracker is sufficient for experience of the XR content from a first person view, but a method and apparatus capable of simultaneously tracking the upper body motion and lower body motion of the user are required for experience of the XR content using a three-dimensional avatar in which both a first person view and a third person view are used. However, an outside-in HMD tracker of the related art has the inconvenience of having to wear a separate wearable sensor in order to track a full body motion of a user. Most HMD devices themselves do not support a full body motion tracking function.

Therefore, when a separate sensing device is additionally used, a motion of a user tracked by the sensing device and a motion of the user tracked by the HMD tracker should be registered and displayed to the user.

SUMMARY

A main purpose of the present disclosure is to provide a method and apparatus capable of performing calibration between an outside-in HMD tracker and an RGB-D camera without using a separate calibration tool.

Another main purpose of the present disclosure is to provide a method and apparatus capable of precisely tracking a full body motion of a user including head, hand, upper body, and lower body motions by performing calibration between an outside-in HMD tracker and an RGB-D camera.

Yet another main purpose of the present disclosure is to provide a method and apparatus capable of allowing a user to experience a metaverse through a three-dimensional avatar by using an outside-in HMD tracker for tracking a head motion and hand motion of the users and an RGB-D camera for tracking a body motion of the user.

Technical objects to be achieved by the present disclosure are not limited to those described above, and other technical objects not mentioned above may also be clearly understood from the detailed descriptions given below by those skilled in the art to which the present disclosure belongs.

An embodiment of the present disclosure provides a method for registering motion of a user tracked by heterogeneous sensors, the heterogeneous sensors comprising a first sensor for detecting a plurality of feature points representing joints of the user and a second sensor for detecting a position and an orientation of a device carried by the user, the method comprising: initializing the first sensor so that an origin of a first sensor coordinate system is adjacent to an origin of a device coordinate system, wherein the device coordinate system is a three-dimensional coordinate system with a current position of the device as the origin; and determining a calibration parameter for transforming coordinates of the plurality of feature points according to the first sensor coordinate system to coordinates according to a second sensor coordinate system, based on the position and orientation of the device in the second sensor coordinate system.

Another embodiment of the present disclosure provides an apparatus for registering motion of a user tracked by heterogeneous sensors, the heterogeneous sensors comprising a first sensor for detecting a plurality of feature points representing joints of the user and a second sensor for detecting a position and an orientation of a device carried by the user, the apparatus comprising: at least one memory configured to store instructions; and at least one processor, wherein the at least one processor executes the instructions to initialize the first sensor so that an origin of a first sensor coordinate system is adjacent to an origin of a device coordinate system, wherein the device coordinate system is a three-dimensional coordinate system with a current position of the device as the origin; and determine a calibration parameter for transforming coordinates of the plurality of feature points according to the first sensor coordinate system to coordinates according to a second sensor coordinate system, based on the position and orientation of the device in the second sensor coordinate system.

According to an embodiment of the present disclosure, there is an effect of being able to track the full body motion of the user without wearing a separate wearable sensor for tracking the full body motion of the user.

According to an embodiment of the present disclosure, there is an effect of being able to register motion of a user tracked using different sensors without a separate calibration tool.

The advantageous effects of the present disclosure are not limited to those described above; other advantageous effects of the present disclosure not mentioned above may be understood clearly by those skilled in the art from the descriptions given below.

DETAILED DESCRIPTION

Hereinafter, some exemplary embodiments of the present disclosure will be described in detail with reference to the accompanying drawings. In the following description, like reference numerals preferably designate like elements, although the elements are shown in different drawings. Further, in the following description of some embodiments, a detailed description of known functions and configurations incorporated therein will be omitted for the purpose of clarity and for brevity.

Additionally, various terms such as first, second, A, B, (a), (b), etc., are used solely to differentiate one component from the other but not to imply or suggest the substances, order, or sequence of the components. Throughout this specification, when a part 'includes' or 'comprises' a component, the part is meant to further include other components, not to exclude thereof unless specifically stated to the contrary. The terms such as 'unit', 'module', and the like refer to one or more units for processing at least one function or operation, which may be implemented by hardware, software, or a combination thereof.

The following detailed description, together with the accompanying drawings, is intended to describe exemplary embodiments of the present disclosure and is not intended to represent the only embodiments in which the present disclosure may be practiced.

Figure 1:
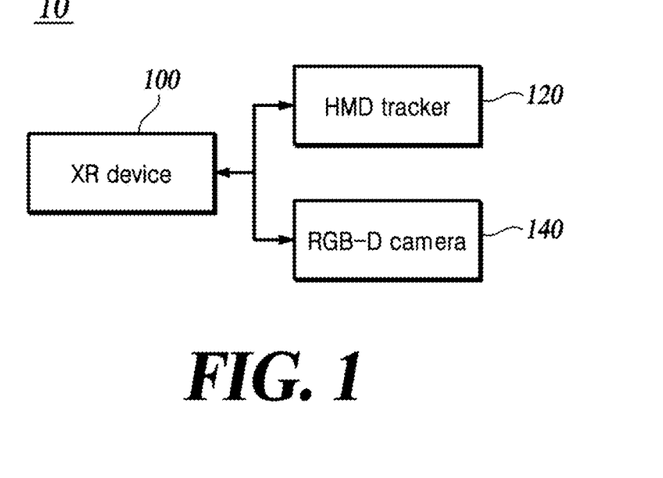
FIG. 1 is a block diagram schematically illustrating a full body motion tracking system according to an embodiment of the present disclosure.

FIG. 1 is a block diagram schematically illustrating a full body motion tracking system according to an embodiment of the present disclosure.

The full body motion tracking system 10 includes an XR (eXtended Reality) device 100, an HMD (Head Mounted Display) tracker 120, and an RGB-D camera 140. Not all blocks illustrated in FIG. 1 are essential components, and some blocks included in an electronic device may be added, changed, or deleted in other embodiments. Subcomponents of the full body motion tracking system 10 illustrated in FIG. 1 represent functionally distinct elements, and at least one component may be implemented in a form in which components are integrated with each other in an actual physical environment. For example, the full body motion tracking system 10 may include a memory and at least one processor, and functions of the XR device 100, the HMD tracker 120, and/or the RGB-D camera 140 may be performed by at least one processor executing instructions stored in the memory.

The XR device 100 may include a display in the form surrounding the head of the user. The XR device 100 may include an HMD device, that is, an HMD headset, which is worn on the head of the user and provides a display right in front of eyes of the user. The XR device 100 may include a sensor that is worn on the head of the user and can track the head motion of the user.

The XR device 100 may further include an XR controller for tracking the hand motion of the user. The XR controller may be used for motion control of a three-dimensional avatar and interaction in a three-dimensional metaverse space.

The HMD tracker 120 tracks the head motion and/or hand motion of the head. The HMD tracker 120 may track the head motion of the user by tracking the HMD headset. The HMD tracker 120 may track the hand motion of the user by tracking the XR controller.

In an embodiment of the present disclosure, the HMD tracker 120 may be an outside-in HMD tracker. The outside-in tracker includes one or more external devices (base stations, lighthouses, or the like) and detects an orientation and position of the HMD headset and/or the XR controller using external devices. The external devices are disposed in a surrounding environment to acquire information about a motion of the XR user from one or more sensors and transfer the information to the XR device in real time.

The outside-in HMD tracker 120 according to an embodiment of the present disclosure may scan a three-dimensional space using one or more laser sensor of one or more base stations and track the head motion and/or hand motion of the XR user in the three-dimensional space.

The RGB-D camera 140 tracks a full body motion. The RGB-D camera 140 can track an upper body motion and/or a lower body motion. The RGB-D camera 140 captures both color information RGB and depth information D in real time. The RGB-D camera 140 acquires depth information using a depth sensor that can measure a distance to an object. A three-dimensional depth sensor such as a stereo sensor or a time of flight (ToF) sensor, for example, may be used as the depth sensor.

The RGB-D camera 140 may track an upper body motion and/or lower body motion of the XR user by tracking a skeleton configured of a plurality of joints. The RGB-D camera 140 tracks the joints of the upper body and/or lower body of the user to acquire the full body motion of the user. The RGB-D camera 140 may transfer information on the upper body motion and/or lower body motion of the XR user to the HMD device in real time.

Figure 2:
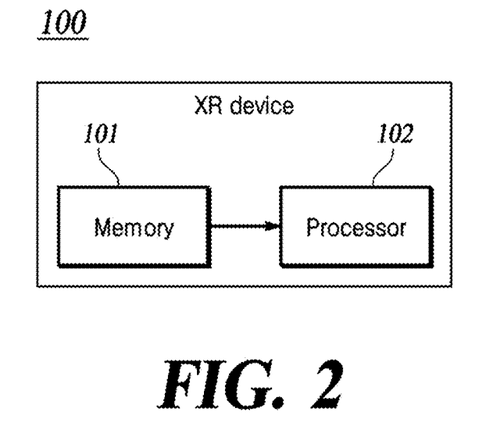
FIG. 2 is a block diagram schematically illustrating an XR device according to an embodiment of the present disclosure.

FIG. 2 is a block diagram schematically illustrating the XR device 100 according to an embodiment of the present disclosure.

The XR device 100 includes a memory 101 and a processor 102. The XR device 100 may be implemented in the form of, for example, an electronic device in an embedded device. Not all blocks illustrated in FIG. 2 are essential components, and some blocks included in the XR device 100 may be added, changed, or deleted in other embodiments. Meanwhile, the components illustrated in FIG. 2 represent functionally distinct elements, and at least one of the components may be implemented in a form in which the components are integrated with each other in an actual physical environment.

The memory 101 stores data and instructions required for an operation of the XR device 100.

The memory 101 may store information for tracking user motion including the head motion, hand motion, and the like of the user acquired using the HMD tracker 120. The memory 101 may store information for tracking user motions including the upper body motion, lower body motion, and the like of the user acquired using the RGB-D camera 140.

The processor 102 controls the overall operation of the XR device 100. The processor 102 may be implemented with one or more processors. The processor 102 may execute the instructions stored in the memory 101. The processor 102 may register pieces of user motion information acquired from the HMD tracker 120 and the RGB-D camera 140. The processor 102 may register the head, hand, upper body, and lower body motion of the user to display a three-dimensional avatar representing the user to the user.

Figure 3:
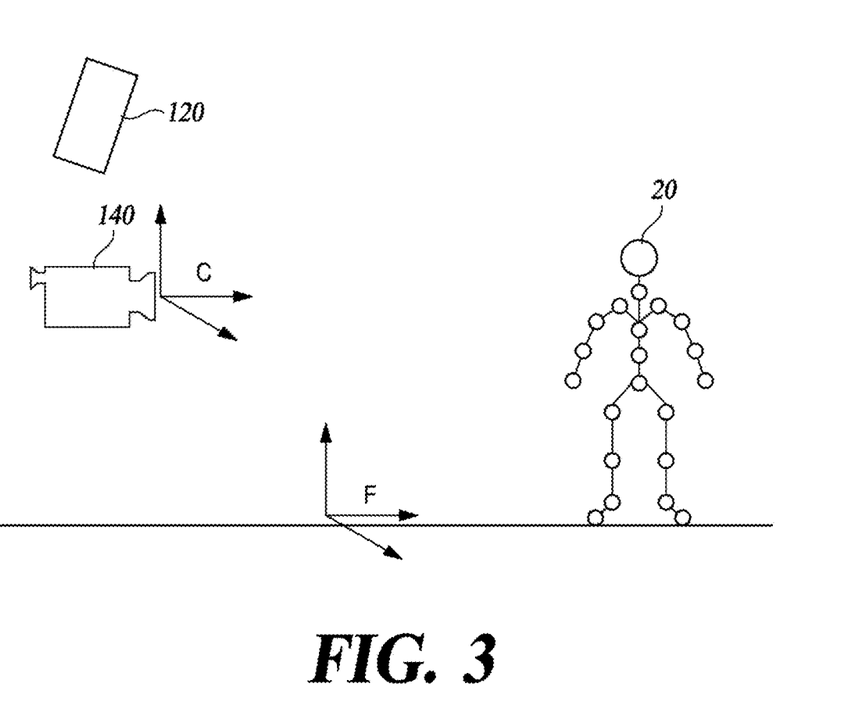
FIG. 3 is an illustrative diagram illustrating origins and directions of a plurality of coordinate systems used for user motion tracking.

FIG. 3 is an illustrative diagram illustrating origins and directions of a plurality of coordinate systems used for user motion tracking. In FIG. 3, C is the RGB-D camera coordinate system, and F is the floor coordinate system.

The HMD tracker 120 scans an actual three-dimensional space in an initial room setting process. The HMD tracker 120 sets an initial position of the XR user 20 on a floor surface of the scanned three-dimensional space as an origin $O_F$ of the three-dimensional space coordinate system, that is, the floor coordinate system F. Directions of the coordinate axes (x-axis, y-axis, and z-axis) of the floor coordinate system F may be arbitrarily determined by the user 20.

The RGB-D camera 140 scans the three-dimensional space using an infrared sensor, or the like, and sets a center of the camera 140 as an origin $O_C$ of the three-dimensional space coordinate system, that is, the RGB-D camera coordinate system C.

The HMD tracker 120 tracks the head motion and hand motion of the user 20 based on the floor coordinate system F, and the RGB-D camera 140 tracks an upper body motion and lower body motion of the user 20 based on the RGB-D camera coordinate system C. Since the HMD tracker 120 and the RGB-D camera 140 track the motion of the user 20 based on the different coordinate systems, a calibration process for registering the two coordinate systems is required.

Since the HMD tracker 120 and the RGB-D camera 140 use different sensors for motion tracking and have different tracking schemes and targets, a separate calibration device for processing complex calculations is required to effectively register the floor coordinate system F with the RGB-D camera coordinate system C. However, the full body motion tracking system 10 according to the present disclosure can perform calibration between the floor coordinate system F and the RGB-D camera coordinate system C without a separate calibration tool.

The XR device 100 may register the head motion and/or hand motion of the user 20 obtained from the HMD tracker 120 with the full body motion of the user 20 acquired from the RGB-D camera 140. In one embodiment, the XR device 100 may register the head motion and hand motion of the user 20 with the full body motion of the user 20 based on the floor coordinate system F by transforming the full body motion represented in the RGB-D camera coordinate system C to the floor coordinate system F. In another embodiment, the XR device 100 may register the head motion and hand motion of the user 20 with the full body motion of the user 20 based on the RGB-D camera coordinate system C by transforming the head motion and hand motion represented in the floor coordinate system F to the RGB-D camera coordinate system C.

Figure 4:
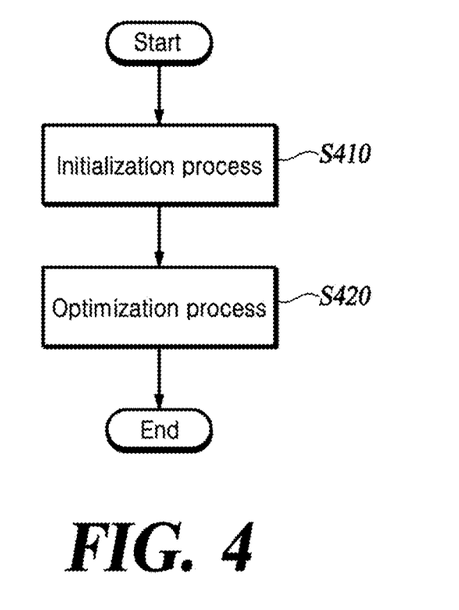
FIG. 4 is a flowchart illustrating an automatic calibration algorithm for registering a head motion and hand motion of a user with a full body motion of the user in a full body motion tracking system according to an embodiment of the present disclosure.

FIG. 4 is a flowchart illustrating an automatic calibration algorithm for registering the head motion and hand motion of the user 20 with the full body motion of the user 20 in the full body motion tracking system 10 according to an embodiment of the present disclosure. The HMD device 100 uses the automatic calibration algorithm of the present disclosure. The automatic calibration algorithm of the present disclosure includes two steps: an initialization process (S410) and an optimization process (S420). In one embodiment, the HMD device 100 may register the head motion and hand motion of the user 20 with the full body motion of the user 20 only through the initialization process (S410). In another embodiment, the HMD device 100 may register the head motion and hand motion of the user 20 with the full body motion of the user 20 through the initialization process (S410) and the optimization process (S420).

In one embodiment, the calibration initialization process (S410) is a process of calculating a rotation matrix and a translation matrix for transforming the full body motion represented in the RGB-D camera coordinate system C to the floor coordinate system F.

Equation 1 is a formula for transforming the coordinates defined in the RGB-D camera coordinate system C to the coordinates defined in the floor coordinate system F, for an arbitrary point X in a space.

$$X_F = R_{CF} \times X_C + T_{CF} \qquad \text{[Equation 1]}$$

In Equation 1, $X_F$ is coordinates of X expressed based on the floor coordinate system F, and $X_C$ is coordinates of X expressed based on the RGB-D camera coordinate system C. $R_{CF}$ is a rotation matrix for transforming $X_C$ from the RGB-D camera coordinate system C to the floor coordinate system F, and TCF is a translation matrix for transforming $X_C$ from the RGB-D camera coordinate system C to the floor coordinate system F.

The HMD device 100 may register the head motion and/or hand motion of the user 20 with the full body motion of the user 20 based on the floor coordinate system F by transforming the full body motion of the user 20 represented in the RGB-D camera coordinate system C to the floor coordinate system F.

The calibration initialization process (S410) is a process of calculating the rotation matrix $R_{CF}$ and the translation matrix $T_{CF}$. A method of registering coordinate systems in the related art requires a large number of three-dimensional coordinate pieces of data corresponding to $X_F$ and $X_C$ in order to acquire $R_{CF}$ and $T_{CF}$. Therefore, the method of registering coordinate systems in the related art includes acquiring the large number of three-dimensional coordinate pieces of data corresponding to $X_F$ and $X_C$ using a board or cube with a calibration pattern. The method of the related art requires a complicated process and has the disadvantage that an XR user should use a separate calibration tool.

The HMD device 100 according to the present disclosure can calibrate the HMD tracker and the RGB-D camera through the initialization process (S410) without using a separate calibration tool for coordinate system registration.

Figure 5:
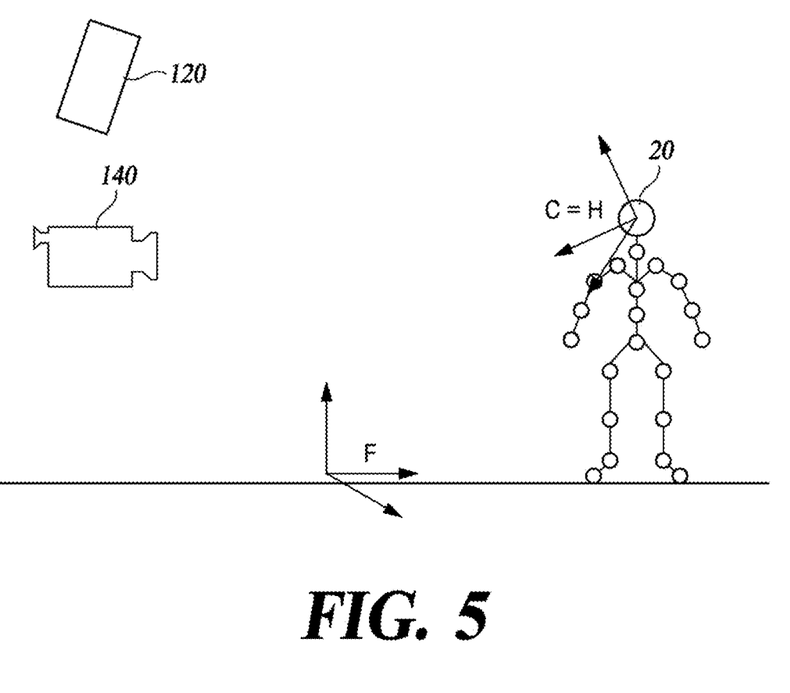
FIG. 5 is an illustrative diagram illustrating a process of acquiring $R_{CF}$ and $T_{CF}$ in an initialization process.

FIG. 5 is an illustrative diagram illustrating a process of acquiring $R_{CF}$ and $T_{CF}$ in the initialization process (S410). In FIG. 5, C is the RGB-D camera coordinate system, F is the floor coordinate system, and H is the HMD headset coordinate system. The HMD headset coordinate system H is a coordinate system in which the HMD headset worn by the user 20 is an origin, and coordinate axes are determined by an orientation of the HMD headset.

The RGB-D camera 140 sets the center of the camera 140 as the origin $O_C$ of the three-dimensional space coordinate system, that is, the RGB-D camera coordinate system C, and sets the axes of the three-dimensional space coordinate system based on an orientation of the camera 140. Therefore, when the HMD device 100 and the RGB-D camera 140 are aligned at the same position and in the same orientation, the RGB-D camera coordinate system C can be set similarly to the UN/ID headset coordinate system H.

When a setting for matching the origin $O_C$ of the RGB-D camera coordinate system C with an origin $O_H$ of the HMD headset coordinate system H and aligning an axis direction of the RGB-D camera coordinate system C to an axis direction of the HMD headset coordinate system H is completed, the RGB-D camera 140 tracks the full body motion of the user 20 based on the RGB-D camera coordinate system C.

The HMD device 100 acquires coordinates $H_F$ of the HMD headset based on the floor coordinate system F from the UN/D tracker 120. Equation 2 for initializing the translation matrix $T_{CF}$ can be derived from Equation 1. Equation 2 is a equation for initializing the translation matrix $T_{CF}$ for transforming the RGB-D camera coordinate system C to the floor coordinate system F.

$$T_{CF}^{(0)} \approx H_F - R_{CF} \times O_C = H_F \quad \text{[Equation 2]}$$

In Equation 2, $T_{CF}^{(0)}$ is an initial value of the translation matrix $T_{CF}$ for transforming the origin $O_C$ of the RGB-D camera coordinate system C to the floor coordinate system F.

When a three-dimensional axis of the RGB-D camera coordinate system C is aligned with a three-dimensional axis of the HMD headset coordinate system H, the rotation matrix $R_{CF}$ for transform from the RGB-D camera coordinate system C to the floor coordinate system F becomes the same as the rotation matrix $R_{HF}$ for transform from the HMD headset coordinate system H to the floor coordinate system F. Therefore, the rotation matrix $R_{CF}$ can be initialized into the rotation matrix $R_{HF}$, as in Equation 3.

$$R_{CF}^{(0)} \approx R_{HF} \quad \text{[Equation 3]}$$

In Equation 2, $R_{CF}^{(0)}$ is an initial value of the rotation matrix $R_{CF}$ for transforming the origin $O_C$ of the RGB-D camera coordinate system C to the floor coordinate system F.

When the rotation matrix $R_{CF}$ and the translation matrix $T_{CF}$ are initialized using Equations 2 and 3, any coordinates $X_C$ defined in the RGB-D camera coordinate system C from Equation 1 can be transformed to the coordinates $X_F$ defined in the floor coordinate system $O_F$.

Equation 4 is a formula for transforming any coordinates $X_C$ defined in the RGB-D camera coordinate system C to the coordinates $X_F$ defined in the floor coordinate system $O_F$.

$$X_F \approx R_{CF}^{(0)} \times X_C + T_{CF}^{(0)} \quad \text{[Equation 4]}$$

Through the initialization process (S410), coordinates of the head, hand, upper body, and lower body joints of the user 20 defined in the RGB-D camera coordinate system C may be registered based on the floor coordinate system F.

Since the origins and the three-dimensional axes of the RGB-D camera coordinate system C and the HMD headset coordinate system H cannot be exactly matched, there is an error between the rotation matrix $R_{CF}$ and the translation matrix $T_{CF}$ acquired in the initialization process (S410). Therefore, the full body motion tracking system 10 according to the present disclosure can perform the optimization process (S420) of optimizing the translation matrix $T_{CF}^{(0)}$ and the rotation matrix $R_{CF}^{(0)}$ acquired in the initialization process (S410).

The full body motion tracking system 10 uses a stochastic gradient descent (SGD) to minimize errors present in the rotation matrix $R_{CF}^{(0)}$ and the translation matrix $T_{CF}^{(0)}$ initialized in the initialization process (S410). The full body motion tracking system 10 defines a cost function and calculates the rotation matrix $R_{CF}$ and the translation matrix $T_{CF}$ that minimize the cost function.

Optimization may be performed for each frame while the user is using the XR HMD and the RGB-D camera, and may also be performed repeatedly at preset time intervals or preset timestamps. Equation 5 is a formula for repeatedly optimizing the translation matrix $T_{CF}$.

$$\begin{cases} \nabla T_{CF}^{(n)} = X_F^{(n-1)} - R_{CF}^{(n-1)} \times X_c^{(n-1)} \\ T_{CF}^{(n)} = T_{CF}^{(n-1)} - \lambda_T \nabla T_{CF}^{(n)} \end{cases} \quad \text{[Equation 5]}$$

In Equation 5, n is a natural number, $T_{CF}^{(n)}$ is a translation matrix optimized n times, and $R_{CF}^{(n)}$ is a rotation matrix optimized n times. $X_F^{(n)}$ is coordinates representing a position of the head and/or hand in the floor coordinate system F in an n-th frame, and $X_C^{(n)}$ is coordinates representing a joint of the head and/or hand among upper body joints in the RGB-D camera coordinate system C to which the calibration has been applied in the n-th frame. $\nabla T_{CF}^{(n)}$ is defined as a difference between $X_F^{(n-1)}$ and $X_C^{(n-1)}$. $\lambda_T$ is a learning rate.

The full body motion tracking system 10 can repeatedly optimize the translation matrix $T_{CF}$ by using Equation 5 so that a difference between position coordinates of the head and/or hand tracked by the HMD tracker 120 and coordinates of the head joint and/or hand joint tracked by the RGB-D camera 140 is minimized.

In one embodiment, the full body motion tracking system 10 may use an Euler angle to repeatedly optimize the rotation matrix $R_{CF}$.

Equation 6 is a formula for repeatedly optimizing the rotation matrix $R_{CF}$ by converting the rotation matrix $R_{CF}$ into a rotation vector $\theta_{CF}$ expressed by an Euler angle and optimizing $\theta_{CF}$.

$$\begin{cases} \nabla \theta_{CF}^{(n)} = \theta_F^{(n-1)} - \theta_C^{(n-1)} \\ \theta_{CF}^{(n)} = \theta_{CF}^{(n-1)} - \lambda_\theta \nabla \theta_{CF}^{(n)} \end{cases} \quad \text{[Equation 6]}$$

In Equation 6, n is a natural number, $\theta_{CF}$ is a rotation vector corresponding to the rotation matrix $R_{CF}$, and $\theta_{CF}^{(n)}$ is a rotation vector subjected to optimization n times. $\theta_F(n)$ represents a rotation vector of the head in the floor coordinate system F in the n-th frame, and $\theta_C^{(n)}$ represents a rotation vector of the head in the RGB-D camera coordinate system C to which calibration is applied in the n-th frame. $\nabla \theta_{CF}^{(n)}$ is defined as a difference between $\theta_F^{(n-1)}$ and $\theta_C^{(n-1)}$. $\lambda_\theta$ is a learning rate.

The full body motion tracking system 10 repeatedly optimizes the rotation vector $\theta_{CF}$ using Equation 5 so that a difference between an Euler angle of the head tracked by the HMD tracker 120 and an Euler angle of the head joint tracked by the RGB-D camera 140 is minimized. When the rotation matrix is calculated again using $\theta_{CF}$, the optimized rotation matrix $R_{CF}$ can be acquired.

The full body motion tracking system 10 minimizes the errors present in the initial rotation matrix $R_{CF}^{(0)}$ and the translation matrix $T_{CF}^{(0)}$, thereby allowing the XR user to experience a precise interaction with XR-based metaverse content through a three-dimensional avatar.

Figure 6:
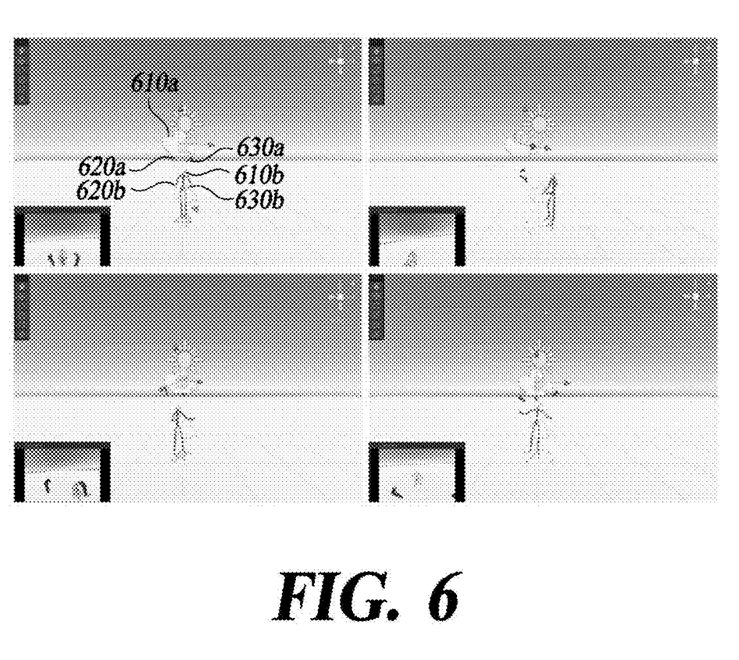
FIG. 6 illustrates a result of motion tracking using an HMD tracker and an RGB-D camera before performing a calibration method according to the present disclosure.

FIG. 6 illustrates the motion tracking result using an HMD tracker and an RGB-D camera before performing the calibration method according to the present disclosure. In this example, two base stations for an outside-in HMD tracker were used, and one RGB-D camera was used.

The outside-in HMD tracker tracks the motion of the head and both hands of the XR user by tracking the headset worn on the head and the controller held in both hands of the XR user. The RGB-D camera tracks the upper body motion and lower body motion of the user by tracking a skeleton configured of 32 joints of the XR user.

Positions of a headset 410*a* and a head joint 410*b* on the skeleton, a right-hand controller 420*a* and a right-hand joint 420*b* on the skeleton, and a left-hand controller 430*a* and a left-hand joint 430*b* on the skeleton should be registered in order for the XR user to precisely interact with metaverse content through a three-dimensional avatar.

Referring to FIG. 6, it can be confirmed that, before the floor coordinate system and the RGB-D camera coordinate system are registered, motion of the head 410*a*, the right hand 420*a*, and the left hand 430*a* acquired from the outside-in HMD tracker are not registered with motion of the head 410*b*, the right hand 420*b*, and the left hand 430*b* acquired from the RGB-D camera.

Figure 7:
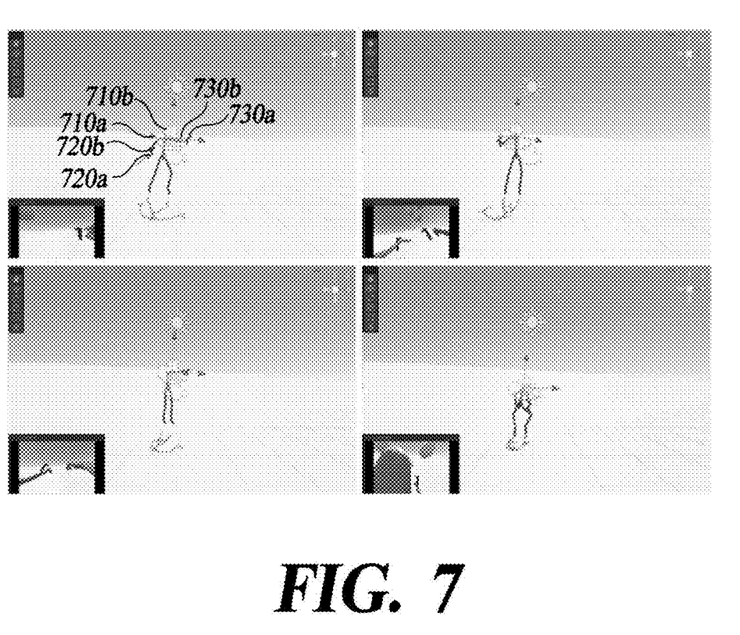
FIG. 7 illustrates a result of motion tracking using an HMD tracker and an RGB-D camera after performing a calibration method according to the present disclosure.

FIG. 7 is an illustrative diagram illustrating results of motion tracking using the HMD tracker and the RGB-D camera after performing the calibration method according to the present disclosure. The calibration between the HMD tracker and the RGB-D camera was performed using a two-step automatic calibration algorithm according to the present disclosure. In the optimization process, the learning rates $\lambda_T$ and $\lambda_\theta$ were set to 0.001.

Referring to FIG. 7, it can be confirmed that, since the registration of the floor coordinate system and the RGB-D camera coordinate system has been achieved using the method according to the present disclosure, motion of a head 510*a*, a right hand 520*a*, and a left hand 530*a* acquired from the outside-in HMD tracker are registered with motion of a head 510*b*, a right hand 520*b*, and a left hand 530*b* acquired from the RGB-D camera.

Figure 8:
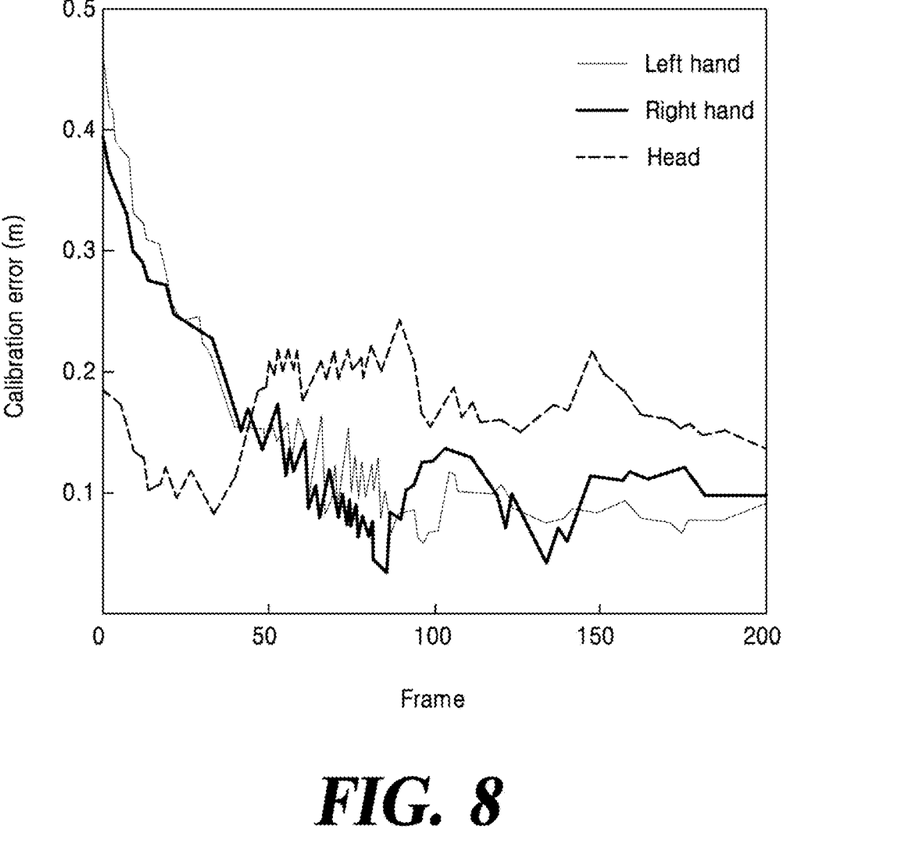
FIG. 8 illustrates a graph of a calibration error between the HMD tracker and the RGB-D camera over time when an automatic calibration algorithm is applied according to the present disclosure.

FIG. 8 illustrates a graph of a calibration error between the HMD tracker and the RGB-D camera over time when the automatic calibration algorithm is applied according to the present disclosure. In FIG. 8, a horizontal axis represents the frame, and a vertical axis represents the calibration error. In this example, the calibration error was calculated for each frame. Referring to FIG. 8, it can be seen that, with the method according to the present disclosure, it is possible to effectively minimize an error between the head (headset) motion and the hand (controller) motion tracked using the HMD tracker and the head motion and the hand motion tracked using the RGB-D camera.

Figure 9:
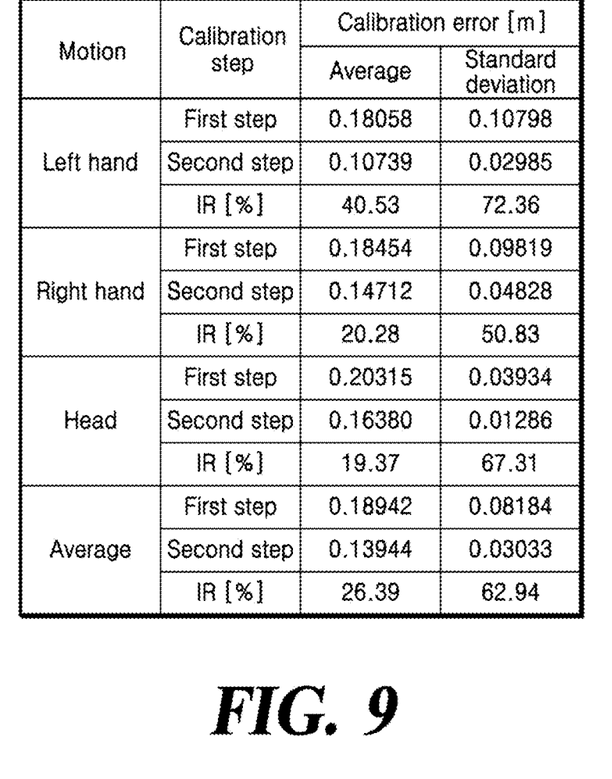
FIG. 9 is a table showing automatic calibration performance of the full body motion tracking system according to the present disclosure by analyzing a calibration error between the HMD tracker and the RGB-D camera registered using the automatic calibration algorithm according to the present disclosure.

FIG. 9 illustrates a table showing automatic calibration performance of the full body motion tracking system 10 according to the present disclosure by analyzing a calibration error between the HMD tracker and the RGB-D camera registered using the automatic calibration algorithm according to the present disclosure. Referring to FIG. 9, it can be seen that the method and apparatus according to the present disclosure effectively minimize the error between the head (headset) motion and the hand (controller) motion tracked using the HMD tracker and the head motion and the hand motion tracked using the RGB-D camera through a two-step automatic calibration process.

In the automatic calibration algorithm according to the present disclosure, referring to a performance improvement rate IR of an optimization process in a second step, a calibration error of a left-hand motion was reduced by an average of 40.53% and a standard deviation was reduced by 72.36% through the optimization process in the second step after an initialization process in a first step. A calibration error of a right-hand motion was reduced by an average of 20.28% and a standard deviation was reduced by 50.83% through the optimization process in the second step after the initialization process in the first step. A calibration error of the head motion was reduced by an average of 19.37% and a standard deviation was reduced by 67.31% through the optimization process in the second step after the initialization process in the first step. In the case of the calibration errors of the left-hand motion, the right-hand motion, and the head motion, the calibration error was reduced by an average of 26.39% and the standard deviation was reduced by 62.94% after the optimization process through the optimization process in the second step after the initialization process in the first step.

Figure 10:
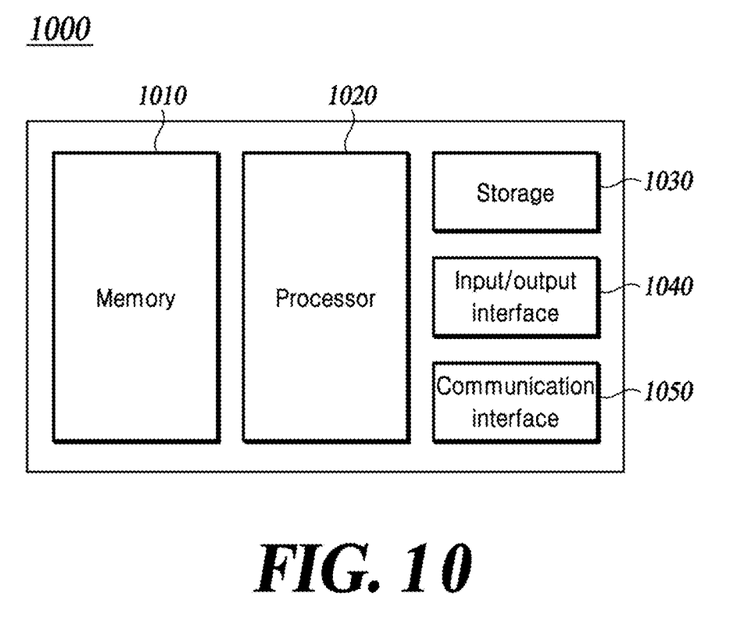
FIG. 10 is a block configuration diagram schematically illustrating an exemplary computing device that can be used to implement the apparatuses and methods described in the present disclosure.

FIG. 10 is a block configuration diagram schematically illustrating an exemplary computing device that can be used to implement the apparatuses and methods described in the present disclosure.

A computing device 1000 may include some or all of a memory 1010, a processor 1020, a storage 1030, an input/output interface 1040, and a communication interface 1050. The computing device 1000 may be a stationary computing device such as a desktop computer or a server, as well as a mobile computing device such as a laptop computer or a smartphone. The computing device 1000 may include any specialized hardware accelerator capable of efficiently processing operations for an artificial intelligence model. For example, the computing device 1000 may include a graphic processing unit (GPU), a tensor processing unit (TPU), or a neural processing unit (NPU).

The memory 1010 may store a program that causes the processor 1020 to perform the methods or operations according to various embodiments of the present disclosure. For example, the program may include a plurality of instructions executable by the processor 1020, and the above-described methods or operations may be performed by the plurality of instructions being executed by the processor 1020. The memory 1010 may be a single memory or a plurality of memories. In this case, information necessary to perform the methods or operations according to various embodiments of the present disclosure may be stored in the single memory or may be divided and stored in the plurality of memories. When the memory 1010 includes the plurality of memories, the plurality of memories may be physically separated. The memory 1010 may include at least one of a volatile memory and a nonvolatile memory. The volatile memory may include a static random access memory (SRAM), a dynamic random access memory (DRAM), or the like, and the nonvolatile memory may include a flash memory, or the like.

The processor 1020 may include at least one core capable of executing at least one instruction. The processor 1020 may execute instructions stored in the memory 1010. The processor 1020 may be a single processor or a plurality of processors.

The storage 1030 maintains stored data even when power supplied to the computing device 1000 is cut off. For example, the storage 1030 may include a nonvolatile memory, and may include storage media such as a magnetic tape, an optical disc, or a magnetic disk. A program stored in the storage 1030 may be loaded into the memory 1010 before being executed by the processor 1020. The storage 1030 may store a file created in a program language, and a program generated from the file by a compiler or the like may be loaded into the memory 1010. The storage 1030 may store data to be processed by the processor 1020 and/or data processed by the processor 1020.

The input/output interface 1040 can provide an interface with an input device such as a keyboard or a mouse and/or an output device such as a display device or a printer. A user can trigger the execution of the program in the processor 1020 through the input device and/or confirm processing results of the processor 1020 through the output device.

The communication interface 1050 can provide access to an external network. The computing device 1000 can communicate with another device through the communication interface 1050.

The components described in the example embodiments may be implemented by hardware components including, for example, at least one digital signal processor (DSP), a processor, a controller, an application-specific integrated circuit (ASIC), a programmable logic element, such as an FPGA, other electronic devices, or combinations thereof. At least some of the functions or the processes described in the example embodiments may be implemented by software, and the software may be recorded on a recording medium. The components, the functions, and the processes described in the example embodiments may be implemented by a combination of hardware and software.

The method according to example embodiments may be embodied as a program that is executable by a computer, and may be implemented as various recording media such as a magnetic storage medium, an optical reading medium, and a digital storage medium.

Various techniques described herein may be implemented as digital electronic circuitry, or as computer hardware, firmware, software, or combinations thereof. The techniques may be implemented as a computer program product, i.e., a computer program tangibly embodied in an information carrier, e.g., in a machine-readable storage device (for example, a computer-readable medium) or in a propagated signal for processing by, or to control an operation of a data processing apparatus, e.g., a programmable processor, a computer, or multiple computers. A computer program(s) may be written in any form of a programming language, including compiled or interpreted languages and may be deployed in any form including a stand-alone program or a module, a component, a subroutine, or other units suitable for use in a computing environment. A computer program may be deployed to be executed on one computer or on multiple computers at one site or distributed across multiple sites and interconnected by a communication network.

Processors suitable for execution of a computer program include, by way of example, both general and special purpose microprocessors, and any one or more processors of any kind of digital computer. Generally, a processor will receive instructions and data from a read-only memory or a random access memory or both. Elements of a computer may include at least one processor to execute instructions and one or more memory devices to store instructions and data. Generally, a computer will also include or be coupled to receive data from, transfer data to, or perform both on one or more mass storage devices to store data, e.g., magnetic, magneto-optical disks, or optical disks. Examples of information carriers suitable for embodying computer program instructions and data include semiconductor memory devices, for example, magnetic media such as a hard disk, a floppy disk, and a magnetic tape, optical media such as a compact disk read only memory (CD-ROM), a digital video disk (DVD), etc. and magneto-optical media such as a floptical disk, and a read only memory (ROM), a random access memory (RAM), a flash memory, an erasable programmable ROM (EPROM), and an electrically erasable programmable ROM (EEPROM) and any other known computer readable medium. A processor and a memory may be supplemented by, or integrated into, a special purpose logic circuit.

The processor may run an operating system (OS) and one or more software applications that run on the OS. The processor device also may access, store, manipulate, process, and create data in response to execution of the software. For purpose of simplicity, the description of a processor device is used as singular; however, one skilled in the art will be appreciated that a processor device may include multiple processing elements and/or multiple types of processing elements. For example, a processor device may include multiple processors or a processor and a controller. In addition, different processing configurations are possible, such as parallel processors.

Also, non-transitory computer-readable media may be any available media that may be accessed by a computer, and may include both computer storage media and transmission media.

The present specification includes details of a number of specific implements, but it should be understood that the details do not limit any invention or what is claimable in the specification but rather describe features of the specific example embodiment. Features described in the specification in the context of individual example embodiments may be implemented as a combination in a single example embodiment. In contrast, various features described in the specification in the context of a single example embodiment may be implemented in multiple example embodiments individually or in an appropriate sub-combination. Furthermore, the features may operate in a specific combination and may be initially described as claimed in the combination, but one or more features may be excluded from the claimed combination in some cases, and the claimed combination may be changed into a sub-combination or a modification of a sub-combination.

Similarly, even though operations are described in a specific order on the drawings, it should not be understood as the operations needing to be performed in the specific order or in sequence to obtain desired results or as all the operations needing to be performed. In a specific case, multitasking and parallel processing may be advantageous. In addition, it should not be understood as requiring a separation of various apparatus components in the above described example embodiments in all example embodiments, and it should be understood that the above-described program components and apparatuses may be incorporated into a single software product or may be packaged in multiple software products.

It should be understood that the example embodiments disclosed herein are merely illustrative and are not intended to limit the scope of the invention. It will be apparent to one of ordinary skill in the art that various modifications of the example embodiments may be made without departing from the spirit and scope of the claims and their equivalents.

Accordingly, one of ordinary skill would understand that the scope of the claimed invention is not to be limited by the above explicitly described embodiments but by the claims and equivalents thereof.

What is claimed is:

1. A method for registering motion of a user tracked by heterogeneous sensors, the heterogeneous sensors comprising a first sensor for detecting a plurality of feature points representing joints of the user and a second sensor for detecting a position and an orientation of a device carried by the user, the method comprising:
   initializing the first sensor so that an origin of a first sensor coordinate system is adjacent to an origin of a device coordinate system, wherein the device coordinate system is a three-dimensional coordinate system with a current position of the device as the origin; and
   determining a calibration parameter for transforming coordinates of the plurality of feature points according to the first sensor coordinate system to coordinates according to a second sensor coordinate system, based on the position and orientation of the device in the second sensor coordinate system.

2. The method of claim 1, further comprising:
   registering a user motion acquired from the first sensor with a user motion acquired from the second sensor using the calibration parameter.

3. The method of claim 2, wherein the device comprises an HMD headset,
   wherein the registering the user motion comprises:
   receiving data for tracking a head motion of the user from the first sensor by detecting a feature point corresponding to a head joint of the user from the plurality of feature points;
   receiving data for tracking the head motion of the user from the second sensor by detecting a position and an orientation of the HMD headset; and
   registering the head motion using the calibration parameter.

4. The method of claim 3, wherein the device further comprises an XR controller,
   wherein the registering the user motion comprises:
   receiving data for tracking a hand motion of the user from the first sensor by detecting a feature point corresponding to a hand joint of the user from the plurality of feature points;
   receiving data for tracking the hand motion of the user from the second sensor by detecting a position and an orientation of the XR controller; and
   registering the hand motion using the calibration parameter.

5. The method of claim 4, further comprising:
   displaying a three-dimensional avatar for interacting with metaverse content to the user based on the registered user motion.

6. The method of claim 2, further comprising:
   displaying a three-dimensional avatar for interacting with metaverse content to the user based on the registered user motion.

7. The method of claim 3, further comprising:
   displaying a three-dimensional avatar for interacting with metaverse content to the user based on the registered user motion.

8. The method of claim 1, wherein the first sensor is an RGB-D camera, and the second sensor is an outside-in HID tracker comprising at least one base station.

9. The method of claim 1, further comprising updating the calibration parameter,
   wherein the updating of the calibration parameter comprises:
   acquiring first data representing the position and the orientation of the device by using the first sensor based on the calibration parameter;
   acquiring second data representing the position and the orientation of the device by using the second sensor; and
   adjusting the calibration parameter based on a difference between the first data and the second data.

10. The method of claim 9, wherein the calibration parameter is updated for each frame.

11. The method of claim 9, wherein the calibration parameter is updated for each preset period or preset time points.

12. The method of claim 1, wherein the calibration parameter comprises a translation matrix and a rotation matrix for transforming coordinates according to the first sensor coordinate system to coordinates according to the second sensor coordinate system,
   wherein the determining the calibration parameter comprises:
   determining the translation matrix using the position of the device in the second sensor coordinate system; and
   determining the rotation matrix using the orientation of the device in the second sensor coordinate system.

13. The method of claim 12, further comprising updating the translation matrix,
   wherein the updating of the translation matrix comprises:
   acquiring data representing a position of a feature point corresponding to the device from the plurality of feature points in the first sensor coordinate system, by using the first sensor;
   acquiring first data representing the position of the feature point corresponding to the device in the second sensor coordinate system, by using the calibration parameter;

acquiring second data representing the position of the device in the second sensor coordinate system, by using the second sensor; and adjusting the translation matrix based on a difference between the first data and the second data.

14. The method of claim 12, further comprising updating the rotation matrix, wherein the updating of the rotation matrix comprises:

acquiring first data representing a direction of a feature point corresponding to the device from the plurality of feature points, by using the first sensor;

acquiring second data representing the orientation of the device, by using the second sensor; and adjusting the rotation matrix based on a difference between the first data and the second data.

15. An apparatus for registering motion of a user tracked by heterogeneous sensors, the heterogeneous sensors comprising a first sensor for detecting a plurality of feature points representing joints of the user and a second sensor for detecting a position and an orientation of a device carried by the user, the apparatus comprising:

at least one memory configured to store instructions; and at least one processor, wherein the at least one processor executes the instructions to:

initialize the first sensor so that an origin of a first sensor coordinate system is adjacent to an origin of a device coordinate system, wherein the device coordinate system is a three-dimensional coordinate system with a current position of the device as the origin; and determine a calibration parameter for transforming coordinates of the plurality of feature points according to the first sensor coordinate system to coordinates according to a second sensor coordinate system, based on the position and orientation of the device in the second sensor coordinate system.

* * * * *